UNITED STATES PATENT OFFICE.

GEORGE F. AHLERS, OF COVINGTON, KENTUCKY.

DESICCATED DISTILLERY SLOP AND PROCESS OF MAKING SAME.

No. 821,326.   Specification of Letters Patent.   Patented May 22, 1906.

Application filed November 20, 1905. Serial No. 288,327.

*To all whom it may concern:*

Be it known that I, GEORGE F. AHLERS, a citizen of the United States, residing at Covington, in the county of Kenton and State of Kentucky, have invented certain new and useful Improvements in Desiccated Distillery Slop and Processes of Making the Same; and I hereby declare the following to be a full, clear, and exact description of the invention, such as will enable others skilled in the art to which it appertains to make and use the same.

This invention relates to improvements in processes of desiccating distillery slop and to products of the same; and it consists in a method of recovering all the solid matters suspended and dissolved in the form of a light dry granular product retaining all the food and fertilizing values of the original slop and in such product, all as more fully hereinafter set forth, matters of novelty being particularly pointed out in the appended claims.

Distillery slop is the residue left after distilling alcohol from fermented mashes in the manufacture of whisky, alcohol, &c., and it represents substantially all the food and fertilizer values of the grain, &c., mashed, save only the starch, which has been converted into alcohol and removed. As starch has a relatively low feeding value, it is obvious that the slop represents a concentrated feeding material in that respect, and its utility as a cattle-feed is well recognized; but its dilute form, owing to the water present, has hitherto prevented its use for such purpose except locally in the neighborhood of a distillery—generally, indeed, on the premises of the distillery itself.

It is the intent of this invention to convert slop into a particular light dry granular permanent form capable of shipment, storage, and convenient handling, and I have devised a simple, easy, and economical method for this purpose, producing a product which will render this valuable cattle-feed available to farmers at a distance and also make possible the return to the farm of all the potash, nitrogen, and phosphoric acids which the crops used in the distillery have removed. For, as before stated, it is only the starch which is useful to the distiller, and substantially all the other valuable constituents of the raw material which he uses—as, for example, corn—are contained in his waste products.

The solid constituents of the slop are both in suspension and in solution. The undissolved and suspended solids consist to a large extent of cellulose, bran, and husk particles from the original grain used, yeast pellicles, and coagulated albuminoids. The dissolved solids comprise unfermented carbohydrates, like dextrin, and some sugar, gums, amids, peptones, albumoses, and a wide variety of other nutritive substances. It is probable that in many instances the soluble solids are of considerably greater food value than the undissolved; but as a rule in the previous history of the art no attempt has been made to save them in endeavoring to prepare dry feeds from the slop. This is for the reason that the liquid portion of the slop is of such physical consistency that it cannot be directly dried to a product of good commercial quality, the solution becoming gummy and sticky as it concentrates beyond a certain point, baking on heating members, adhering to stirring members, and rendering it impossible to secure the extrication of the last portions of the water. Direct dried slop is therefore a viscous mass, difficult to handle commercially. It is therefore customary to take such slop as cannot be fed directly on the premises of a distillery, filter-press it, and dry and market the pressed cake as a cattle-feed, the expressed liquid, carrying its dissolved values, being run to waste. The loss in this manner of operating is obvious. I have, however, discovered that by a simple process I can readily produce a material containing all the solid constituents of the slop, dissolved and undissolved, which is nevertheless bone dry and capable of being packaged in ordinary containers, such as paper or other sacks, or of being handled in bulk, which can be shipped, stored, mixed with other feeds, and which will keep indefinitely, and generally can be handled with as much ease as bran. As it contains all the solid constituents of the grain, &c., which are of food value except the starch, it represents a concentrated feed, and if it is desired to produce a balanced ration it can readily be admixed with cheap starchy feeds—such as bran, shipstuffs, &c.—in any proportion desired for this purpose.

In the preferred embodiment of my invention I take the slop as it leaves the still and separate it into a liquid and a solid portion by any convenient means, as by a press or suction-filter. The liquid is then concentrated into as heavy a syrup as is conveniently practicable. The solid portion—as a press-cake, for example—is then converted into a granular form, coarse or fine, but preferably rather coarse, and preferably dried, completely or partially, to bring it into an absorbent state, absorbent enough to be able to take up into its pores the syrup formed by concentrating the liquid. With some slops where the amount of solids is large enough pressure may be used in a press so that the natural reëxpansion of the cake after leaving the press is sufficient to create the desired amount of dryness and porosity without special drying; but as a rule I prefer to dry the same, at least partially. With and into this absorbent solid material, which is preferably in the form of rather coarse granules, I incorporate the syrup, taking particular care to see that it is entirely absorbed, so as to leave the granules readily separable. With some slops where the liquid portion is large in amount or not readily reduced to a heavy syrup I may perform the incorporation in successive stages, drying the partially-saturated granules between. When the incorporation is complete, the saturated granules may be directly dried in any ordinary drier—as, for instance, a rotary—without fear of its sticking to the apparatus or agglomerating to an undesirable degree. The reduction of the water content may be carried to any desired degree. The granular form of the material undergoing drying and the fact that the viscous materials are entirely contained in the granules make it possible to secure a rapid and complete drying, without a pause during which the material would have opportunity to cool enough to ferment, develop additional acid and a foul smell. My finished product, therefore, is sweet in smell, not having the sour smell of prior products in which more or less acetous fermentation has generally developed, and contains no more than the limited amount of acid naturally present in the slop in case the latter is derived from sour-mash distillation. This latter is merely lactic acid of a pleasant taste and no odor, while in the fermentation to which the material is liable if allowed to cool in the process of treatment acetic acid and higher fatty acids of unpleasant odor and rank taste develop. The slight amount of lactic acid referred to goes with the other soluble solids into the interior of the granules and is not apparent in the taste of the finished product until the latter has been masticated for some time, whereas the prior products which have undergone fermentation during the process taste acid at once.

My process not being dependent upon particular apparatus, any ordinary forms of apparatus may be used, such as filter-presses for the separation of the liquid and solid constituents of the slop, multiple effects for the reduction of the liquid to syrup, rotary driers for drying the solids, &c.

I preferably and usually employ the entire undissolved solids of the slop to absorb the entire dissolved solids of the same, thereby securing a balanced concentrated feed representing the entire slop; but with some slops derived from materials or processes where the amount of undissolved solids in the slop coming from the still is low I may add a portion of bran or similar granular feed; but ordinarily I prefer to use only the slop materials. I am, as I believe, the first to procure the total solid substances of distillery slop in the form of a light dry granular material with all the soluble solids interiorly contained in the insoluble solids, said material representing a concentrated feed containing all the solids of the slop without subtraction or addition, and therefore containing also all the constituents of the original raw material, save the starch, which has been removed as alcohol.

What I claim is—

1. In the process of producing dry feed from distillery slop, the process which consists in separating slop into liquid and solid portions, rendering the solid matters granular and absorbent, evaporating the liquid to a syrup, incorporating said syrup with and into the absorbent granules and drying the mixture.

2. In the process of producing dry feed from distillery slop, the process which consists in separating slop into liquid and solid portions, granulating and drying the solids to render them absorbent, evaporating the liquid to a syrup, incorporating said syrup with and into the absorbent granules and drying the mixture.

3. In the process of producing dry feed from distillery slop, the process which consists in separating slop into liquid and solid portions, rendering the solids granular and absorbent, evaporating the liquid to a syrup, incorporating said syrup with and into a granular absorbent comprising said solids, and drying the mixture.

4. In the process of producing dry feed from distillery slop, the process which consists in separating slop into liquid and solid portions, granulating and drying the solids to render them absorbent, evaporating the liquid to a syrup, incorporating said syrup with and into a granular absorbent comprising said solids, and drying the mixture.

5. The process of producing a dry balanced ration from distillery slop which consists in separating slop into solid and liquid portions, drying and granulating the solids to render them absorbent, evaporating the liquid to a syrup, incorporating said syrup with and into a granular absorbent comprising said solids, drying the mixture and admixing therewith starchy feeds in proportion sufficient to produce a balanced ration.

6. In the process of producing dry feed from distillery slop, the process which consists in separating slop into liquid and solid portions, rendering the solid matters granular and absorbent, evaporating the liquid to a syrup, incorporating said syrup with and into the absorbent granules in successive portions, drying the granules to restore their absorbent nature between additions, and finally drying the granules to a dry condition.

7. A concentrated feed in dry granular form comprising the soluble portion of distillery slop interiorly incorporated into and contained in the granulated insoluble portion of distillery slop, said feed comprising the total solid matter of such slop in a granulated, dry, unfermented form, having an initial sweetish taste and only developing a sour taste after mastication.

In testimony whereof I affix my signature in the presence of two witnesses.

GEORGE F. AHLERS.

Witnesses:
 EDWARD RENZ,
 P. J. BOLAR.